United States Patent Office 3,787,350
Patented Jan. 22, 1974

3,787,350
PHENOL-ARALKYL ETHER RESINS
Glyn Islwyn Harris, Stourbridge, and Alfred Gerald Edwards, Stourport-on-Severn, England, assignors to Albright & Wilson Limited, Oldbury, Warwickshire, England
No Drawing. Filed Jan. 19, 1972, Ser. No. 219,160
Claims priority, application England, Jan. 21, 1971, 2,907/71
Int. Cl. C08g 5/06, 23/00, 37/06
U.S. Cl. 260—38                                  7 Claims

ABSTRACT OF THE DISCLOSURE

Polymeric materials are known to be made by reacting together a phenolic material and an aralkyl ether of the general formula R'[—(CH$_2$OR)]$_a$ where R' is an aromatic hydrocarbon or hydrocarbon ether radical and $a$ is 2 or 3.

The cold flow properties of the polymers can be improved if their production is carried out using a copper, mercuric, mercurous or silver salt or a sodium hydrogen sulphate as catalyst.

Polymers made by this method are particularly suitable for use in moulding compounds or coating materials for application by fluidized bed techniques.

---

This invention relates to the preparation of polymeric materials derived from phenolic compounds.

In British patent specification No. 1,150,203 (corresponding to U.S. 3,576,788) there is described and claimed a method for the preparation of polymeric materials in which there are reacted together (1) an aralkyl ether and (2) a phenolic compound. The reaction between the aralkyl ether and the phenolic compound is preferably carried out in the presence of a catalyst, for example an acidic ball clay or a Friedel Crafts type catalyst. Other catalysts which have been found to be operative are diethyl sulphate and sulphuric acid.

The polymeric materials obtained by the said process may be cross-linked by reaction with, for example, hexamethylene tetramine, and are useful as laminating resins in the fabrication of moulding compounds and as coating materials. However, although such polymeric materials are generally satisfactory in application they have been found to be subject to cold flow at normal ambient temperatures in the uncross-linked state. This property makes it impossible to store the solid polymer in bulk in a finely-divided form for more than a few weeks. Consequently it constitutes a serious drawback to the use of the polymeric materials as moulding compounds where the product is normally required in the form of a free-flowing powder.

We have now found that the reaction between an aralkyl ether and a phenolic compound according to the process of specification No. 1,150,203 may be carried out in the presence of certain copper, mercury, silver or sodium compounds as catalysts. We have also surprisingly found that the polymeric materials obtained with a given phenol and such catalysts have a softening point higher than that obtained when the same phenol and known catalysts are employed. The polymeric materials thus obtained have significantly less tendency to cold flow and are thus better adapted for use e.g. as moulding resins, where storage and use in particulate form is required.

Accordingly the present invention provides a process for the preparation of polymers which comprises reacting (1) an aralkyl ether of the general formula R'[—(CH$_2$OR)]$_a$ wherein R' represents a divalent of trivalent aromatic hydrocarbon or hydrocarbon ether radical, R is an alkyl radical having less than 6 carbon atoms and $a$ is 2 or 3 with (2) from 1.3 to 2.5 moles per mole of (1) of a phenolic compound, the reaction between (1) and (2) being carried out in the catalytic presence of at least one compound of divalent copper, mono or divalent mercury or silver or sodium hydrogen sulphate. Preferably the catalyst is cupric chloride, cupric sulphate, mercuric sulphate, mercurous sulphate, mercuric chloride, mercurous chloride, silver sulphate, silver chloride or sodium hydrogen sulphate.

The invention also includes polymers whenever prepared by the said process.

The term "phenolic compound" as employed herein includes any aromatic compound or mixture of compounds containing from one to three, preferably one or two, hydroxyl radicals attached to the aromatic nucleus, there being a total of not more than three substituents attached to carbon atoms in the aromatic nucleus. Examples of such phenolic compounds are phenol, p-cresol, resorcinol, catechol, isopropyl catechol, diphenylolpropane, diphenylolmethane, alkyl phenols e.g. p-ethylphenol, p-tert-butylphenol and p-tert-octylphenol, p-phenylphenol, m-phenylphenol, p-xylenol, p-aminophenol, pyrogallol and phloroglucinol. When the polymers are intended for use as laminating resins or in the fabrication of moulding compounds the preferred phenolic compounds are phenol and p-phenylphenol.

As the aralkyl ethers there are employed in the process of this invention compounds of the general formula R'[—CH$_2$(OR)]$_a$. In the general formula R' may represent a divalent or trivalent aromatic hydrocarbon or hydrocarbon ether radical for example the phenylene, diphenylene and diphenylene oxide radicals or the radical

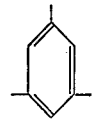

The radical R may be any alkyl radical having less than six carbon atoms but is preferably methyl. The preferred aralkyl ether for use according to this invention is p-xylyleneglycol dimethylether.

If desired the R' radical may contain substituents, for example methyl radicals attached to the aromatic nucleus provided the said substituents are inert under the conditions of the reaction. In fact, the presence of chlorine or bromine atoms in some or all of the available positions in the nucleus has been found advantageous in that it leads to improved flame resistance of the polymeric product.

From 1.3 to 2.5 moles of the phenolic compound should be employed for every mole of the aralkyl ether. When the molecular proportion falls below the specified 1.3:1 ratio and approaches 1:1 the reaction mixture exhibits an increased tendency to gel prematurely. Above the specified 2.5:1 ratio the resulting products become difficult to cure. Polymeric products having the highest softening points are obtained when the ratio of phenol to aralkyl ether is at the low end of the specified range. Preferably therefore the phenolic compound is employed in a ratio of less than 1.7 to 1 and most preferably in a ratio of from 1.4 to 1.6:1.

When prepared comercially the aralkyl ethers may be obtained in combination with other related compounds, for example compounds such as

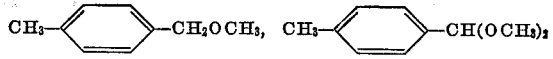

and

The presence of such related products can be tolerated in amounts of up to about 30 percent by weight or more of the aralkyl ether provided the molar proportion of the aralkyl ether itself is such as to provide for the specified ratio of 1.3:1 to 2.5:1.

The reaction between the phenolic compound and aralkyl ether is carried out in the presence of a catalyst which is one or more of cupric chloride, cupric sulphate, mercuric sulphate, mercurous sulphate, mercuric chloride, mercurous chloride, silver sulphate, silver chloride and sodium hydrogen sulphate. Of a wide variety of compounds examined those specified above appear to be particularly effective in giving rise to polymers having suitably increased softening temperatures. The proportion of catalyst employed does not appear to be narrowly critical and we have found that from about 0.05 to 5 percent by weight based on the total weight of (1) and (2) is normally sufficient to give the desired results. The catalyst may be added as such or as a solution or dispersion in a compatibilizing solvent, for example methyl alcohol. When cupric sulphate is employed as an alcohol solution this is preferably used when freshly prepared in view of the tendency of the components to the formation of a complex.

Apart from the specific catalysts employed the polymeric materials may be prepared employing reaction conditions similar to those described in our specification No. 1,150,203. Thus, for example the reaction is carried out at a temperature at which the appropriate alcohol is liberated, generally from about 130 to 200° C. Organic solvents may be present in the reaction mixture if desired but, if used should preferably comprise the high boiling chlorinated aromatic compounds with deactivated rings e.g. chlorobenzene. The catalysts employed according to the present invention are not however suitable for use where it is desired to modify the product by including in the reaction mixture an aromatic compound other than a phenol as taught in the said specification No. 1,150,203.

The polymeric materials obtained according to the process of this invention may also be converted to the cross-linked state employing the techniques described in specification No. 1,150,203. Thus they may be converted to higher molecular weight cross-linked polymers by reaction with hexamethylene tetramine or other novolac hardening agent.

The polymers prepared according to the process of this invention are heat stable to a degree which is often superior to that of the conventional novolac resins. They may be compounded with organic or inorganic fillers and are suitable for use in a variety of applications, for example as binders, laminating resins and in the fabrication of moulding compounds. They may, if desired, be dissolved in organic solvents, e.g. methyl ethyl ketone and methyl cyclohexanone. However, the process of this invention finds particular utility in the preparation of powdered resins for use in moulding compounds and as coating materials for application by fluidized bed techniques. When employed in moulding compounds they are admixed with reinforcing material such as fillers for example wood flour, fibre glass, asbestos or mica and a curing agent such as hexamethylene tetramine.

The following examples illustrate the invention. In Examples 1 to 4 inclusive the p-xylyleneglycol dimethyl-ether employed was a commercial grade and contained by weight approximately 3 percent of p—CH$_3$.C$_6$H$_4$.CH$_2$OCH$_3$ approximately 0.2 percent of p—CH$_3$.C$_6$H$_4$.CH(OCH$_3$)$_2$ and approximately 4.5 percent of p—CH$_3$OCH$_2$.C$_6$H$_4$.CH(OCH$_3$)$_2$ The weight of the ether referred to in Examples 1 to 4 includes the weight of these associated compounds.

EXAMPLE 1

Phenol (554.6 g., 5.9 moles) p-xylyleneglycol dimethyl-ether (680.6 g., 4.1 moles) and cupric sulphate (1.0 g., 0.004 mole) were charged to a reaction flask fitted with a condenser and the mixture heated with stirring at 136–160° C. for approximately 2.5 hours. During this heating step the theoretical quantity of methanol was evolved. The flask temperature was then slowly increased to 200° C. and held at this temperature until the evolution of volatiles had ceased. The contents of the flask were then allowed to cool to 150° C. and poured on to an aluminium foil tray. On further cooling the resinous product solidified and was then crushed to a coarse powder.

The softening point of the resin was determined using a Ball and Ring apparatus and was found to be 97° C. The powdered resin remained free flowing on storage at 22° C. for at least six months.

When the experiment was repeated using in turn 0.004 mole of each of cupric chlorine, zinc sulphate and diethyl sulphate as catalyst resins having softening points of 78, 78 and 76 respectively were obtained. In each case the resin had a marked tendency to cold flow. Particles of the resin coalesced after several weeks when the resin was stored in powdered form at 22° C.

EXAMPLE 2

A resin was prepared using the procedure of Example 1 except that the cupric sulphate was replaced with 0.004 mole (1.98 g.) of mercurous sulphate. The resin had a softening point of 88.5° C. when measured with the Ball and Ring apparatus.

EXAMPLE 3

A resin was prepared using the procedure of Example 1 except that the cupric sulphate was replaced with 0.010 mole (1.71 g.) of cupric chloride. The resin was found to have a softening point of 101° C.

EXAMPLE 4

Resins were prepared using the following catalysts in place of the cupric sulphate in the process of Example 1.

Catalyst: Quantity

Mercuric sulphate _____ 0.0067 mole (2 g.).
    Silver sulphate _____ 0.004 mole (1.25 g.).
    Sodium hydrogen sulphate __ 0.004 mole (0.55 g.).

The resins had softening points of 95, 87 and 93° C. respectively.

EXAMPLE 5

The procedure of Example 1 was repeated using phenol (665.5 g.), cupric sulphate (1.2 g.) and 816.7 g. of a mixture of 5.2% by weight of p—CH$_3$.C$_6$H$_4$.CH$_2$OCH$_3$, 10.5% of p—CH$_3$.C$_6$H$_4$.CH(OCH$_3$)$_2$, 69.4% of p—CH$_3$OCH$_2$.C$_6$H$_4$.CH$_2$OCH$_3$ and 11.8% of p—CH$_3$OCH$_2$.C$_6$H$_4$.CH(OCH$_3$)$_2$.

The resinous product had a softening point of 98° C.

We claim:

1. In a process for the production of polymeric materials by the reaction of an aralkyl ether of the general formula R'(CH$_2$OR)$_a$ wherein R' is a divalent or trivalent aromatic hydrocarbon or hydrocarbon ether radical, R' is an alkyl radical having less than six carbon atoms and $a$ is two or three, with from 1.3 to 2.5 moles per mole of aralkyl ether of a phenolic compound selected from the group consisting of phenol, p-cresol, resorcinol, catechol, isopropyl catechol, bisphenylolpropane, bisphenylol-methane and alkyl phenols, the improvement which consists in carrying out the reaction in the presence of a catalyst which is at least one compound selected from the group consisting of cupric chloride, cupric sulphate, mercuric chloride, mercuric sulphate, mercurous chloride, mercurous sulphate, silver sulphate, silver chloride and sodium hydrogen sulphate.

2. A process as claimed in claim 1 wherein the molar ratio of phenolic compounds to aralkyl ether is in the range 1.4 to 1.6:1.

3. A process as claimed in claim 1 wherein the aralkyl ether is para xylylene glycol dimethyl ether.

4. A process as claimed in claim 3, wherein said aralkyl ether is p-xylyleneglycol dimethyl ether and wherein said phenolic compound is phenol.

5. Improved phenolic polymeric powders having improved cold flow properties prepared by reacting an aralkyl ether of the general formula $R'(CH_2OR)_a$ wherein $R'$ is a divalent or trivalent aromatic hydrocarbon or hydrocarbon ether radical, $R'$ is an alkyl radical having less than six carbon atoms and $a$ is two or three, with from 1.3 to 2.5 moles per mole of aralkyl ether of a phenolic compound selected from the group consisting of phenol, p-cresol, resorcinol, catechol, isopropyl catechol, bisphenylolpropane, bisphenylolmethane and alkyl phenols in the presence of a catalyst which is at least one compound selected from the group consisting of cupric chloride, cupric sulphate, mercuric chloride, mercuric sulphate, mercurous chloride, mercurous sulphate, silver sulphate, silver chloride and sodium hydrogen sulphate.

6. The improved phenolic polymeric powders of claim 5 wherein said ether is p-xylyleneglycol dimethyl ether, and said phenolic compound is phenol.

7. A moulding composition comprising
(1) a polymeric material prepared by the reaction of an aralkyl ether of the general formula $R'(CH_2OR)_a$ wherein $R'$ is a divalent of trivalent aromatic hydrocarbon or hydrocarbon ether radical R is an alkyl radical of less than 6 carbon atoms and $a$ is 2 or 3 with from 1.3 to 2.5 moles per mole of the phenolic compound selected from the group consisting of phenol, p-cresol, resorcinol, catechol, isopropyl cathechol, bisphenylolpropane, bisphenylolmethane and alkyl phenols in the presence of a catalyst which comprises at least one compound selected from the group consisting of cupric chloride, cupric sulphate, mercuric chloride, mercuric sulphate, mercurous chloride, mercurous sulphate, silver sulphate, silver chloride and sodium hydrogen sulphate,
(2) an inorganic filler selected from the group consisting of fibre glass, asbestos and mica, and
(3) hexamethylene tetramine.

References Cited
UNITED STATES PATENTS
3,576,788   4/1971   Harris et al. ---------- 260—52

MELVIN GOLDSTEIN, Primary Examiner

U.S. Cl. X.R.

260—32.8 R, 47 R, 52